United States Patent [19]

Matsuno

[11] Patent Number: 5,301,074
[45] Date of Patent: Apr. 5, 1994

[54] TAPE WRAPPING MECHANISM USED IN MAGNETIC RECORDING/REPRODUCING APPARATUS

[75] Inventor: Hisao Matsuno, Mito, Japan
[73] Assignee: Hitachi, Ltd., Tokyo, Japan
[21] Appl. No.: 719,997
[22] Filed: Jun. 24, 1991

[30] Foreign Application Priority Data

Jun. 22, 1990 [JP] Japan .................................. 2-162915

[51] Int. Cl.⁵ ........................................ G11B 15/665
[52] U.S. Cl. ..................................................... 360/85
[58] Field of Search ...................... 360/84, 85, 93, 95; 242/194, 197

[56] References Cited

U.S. PATENT DOCUMENTS

| | | | |
|---|---|---|---|
| 4,636,887 | 1/1987 | Kato et al. | 360/85 |
| 4,727,441 | 2/1988 | Tsuchida et al. | 360/85 |
| 4,807,064 | 2/1989 | Miyamoto et al. | 360/85 |
| 4,912,578 | 3/1990 | Katohno et al. | 360/85 |
| 5,016,125 | 5/1991 | Takeda et al. | 360/85 |
| 5,041,930 | 8/1991 | Tsuchiya | 360/85 |

FOREIGN PATENT DOCUMENTS 2-37555 2/1990 Japan.

*Primary Examiner*—Stuart S. Levy
*Assistant Examiner*—Paul J. Ditmyer
*Attorney, Agent, or Firm*—Antonelli, Terry, Stout & Kraus

[57] ABSTRACT

A tape wrapping mechanism in a magnetic recording-/reproducing apparatus comprises guide elements for wrapping a recording medium tape onto a head drum, a cam member (3) provided with a cam rift, cam follower following the cam rift to drive the guide elements, and motor (21) for driving the cam member. The mechanism further comprises a loading ring (6) on which members (61) for drawing out the guide element are provided. The guide elements are driven alternately by the cam member (3) and the loading ring (6).

2 Claims, 7 Drawing Sheets

TAPE WRAPPING MECHANISM USED IN MAGNETIC RECORDING/REPRODUCING APPARATUS

FIELD OF THE INVENTION AND RELATED ART STATEMENT

The present invention relates to a magnetic recording/reproducing apparatus such as a video tape recorder, and more particularly a tape wrapping mechanism used in such apparatus.

In a conventional magnetic recording/reproducing apparatus, in order to wrap a recording medium tape onto a head drum, there is used a single loading motor, or a capstan motor disclosed in JP-A-2-37555. In case that the loading motor is used, a loading ring on which drawing members are provided is rotated by the loading motor through a cam member. The drawing members draw out guide elements by which the tape in a cassette is wrapped onto the head drum.

Recently, it is required to enlarge a wrapping angle of the tape against the head drum. Therefore, the loading ring must be rotated about 360° by the cam member. Especially, in case of special operating modes, the guide elements and others are further driven by the cam member. Accordingly, a rotational angle of the cam member itself becomes 500°-600°. However, it is very difficult to provide a single cam member of an ordinary dimension with an enlarged cam profile. In order to obtain such enlarged cam profile, it cannot help enlarging the dimension of the cam member. On the contrary, though it may be possible to use two cam members, use of two cam members requires switchover of the two cam members and the driving mechanism thereof which complicates the apparatus. In either case, it is hard to prevent the tape wrapping mechanism from being enlarged.

OBJECT AND SUMMARY OF THE INVENTION

Accordingly, an object of the present invention is to provide a tape wrapping mechanism which is not only compact in size but also permits a tape wrapping angle around the head drum to be increased, and a tape wrapping method therefor.

Further, another object of the present invention is to provide a compact magnetic recording/reproducing apparatus incorporating the above-mentioned tape wrapping mechanism.

To this end, according to the present invention, the loading ring isn't rotated by a cam member, but by another driving means. The cam member drives the guide elements solely. A switching means alternates the cam member and the another driving means. With this arrangement the above-mentioned objects can be achieved. Other objects and meritorious advantages of the present invention will become more apparent from the description of the preferred embodiment described in connection with the accompanying drawings.

DETAILED DESCRIPTION OF PREFERRED EMBODIMENTS

Figure 1:
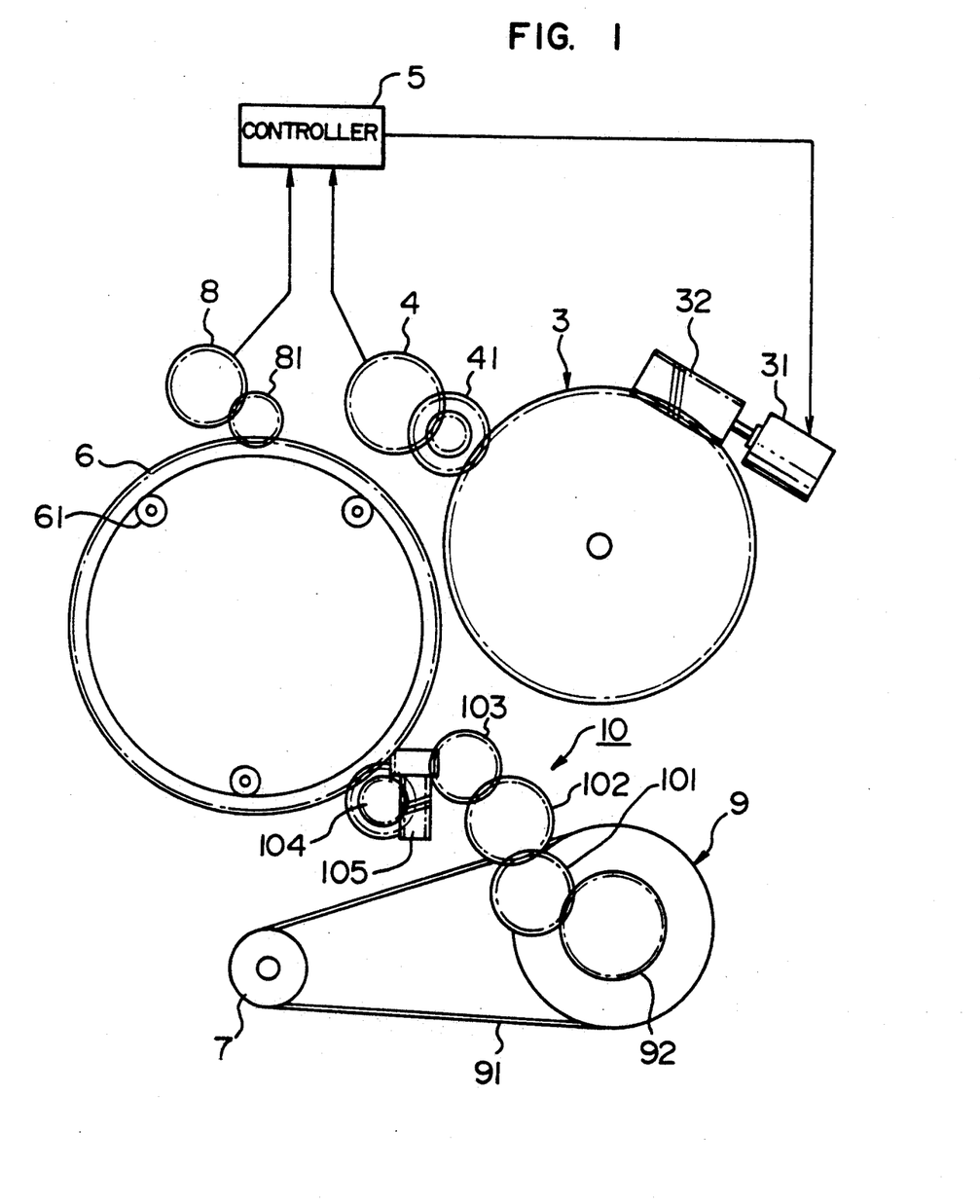
FIG. 1 is a schematic plan view showing a rotation transfer system shown in FIG. 3.
Figure 2:
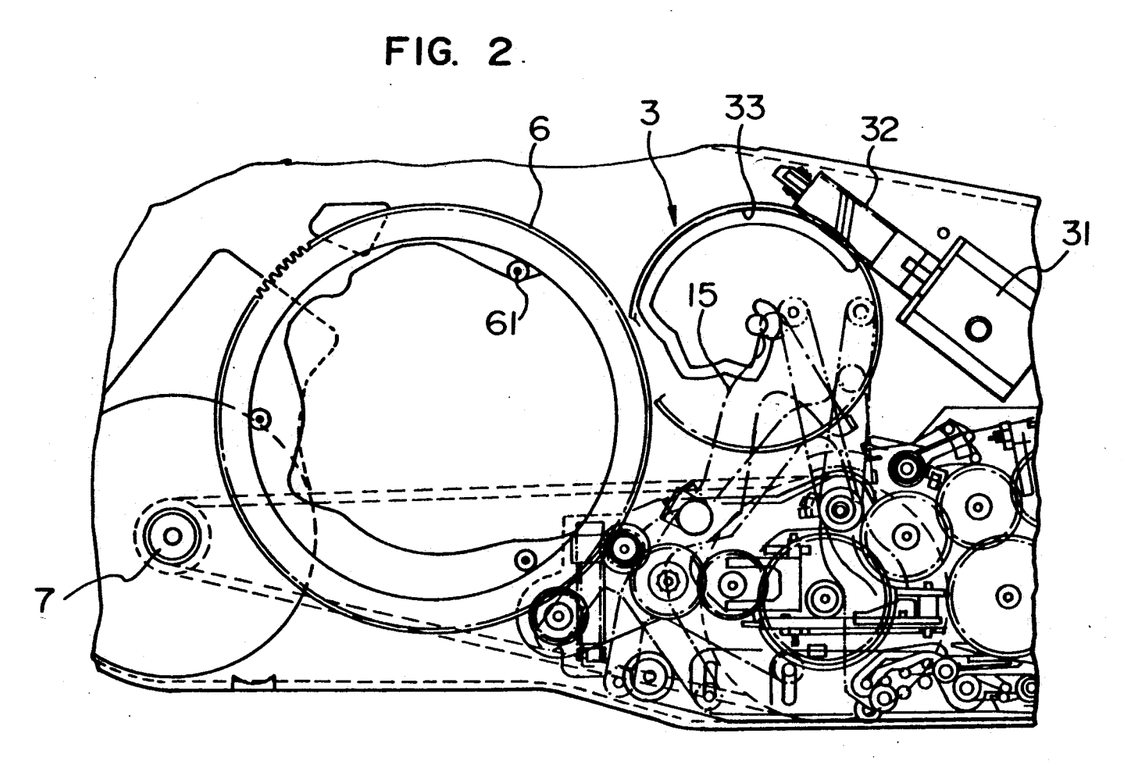
FIG. 2 is a plan view showing the rotation transfer system shown in FIG. 3.
Figure 3:
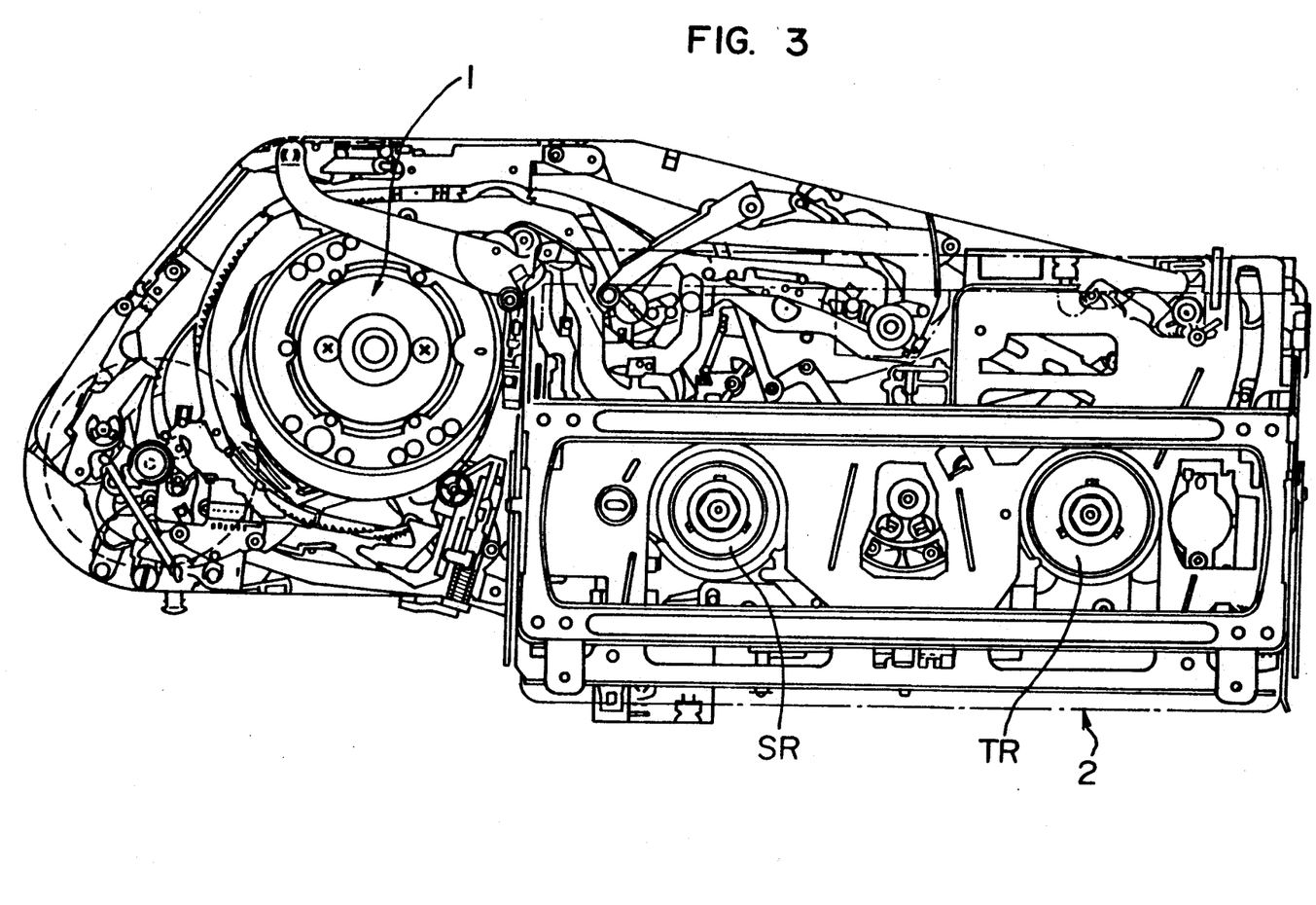
FIG. 3 is a partly sectional fragmentary Plan view showing a preferred embodiment of the present invention.
Figure 4:
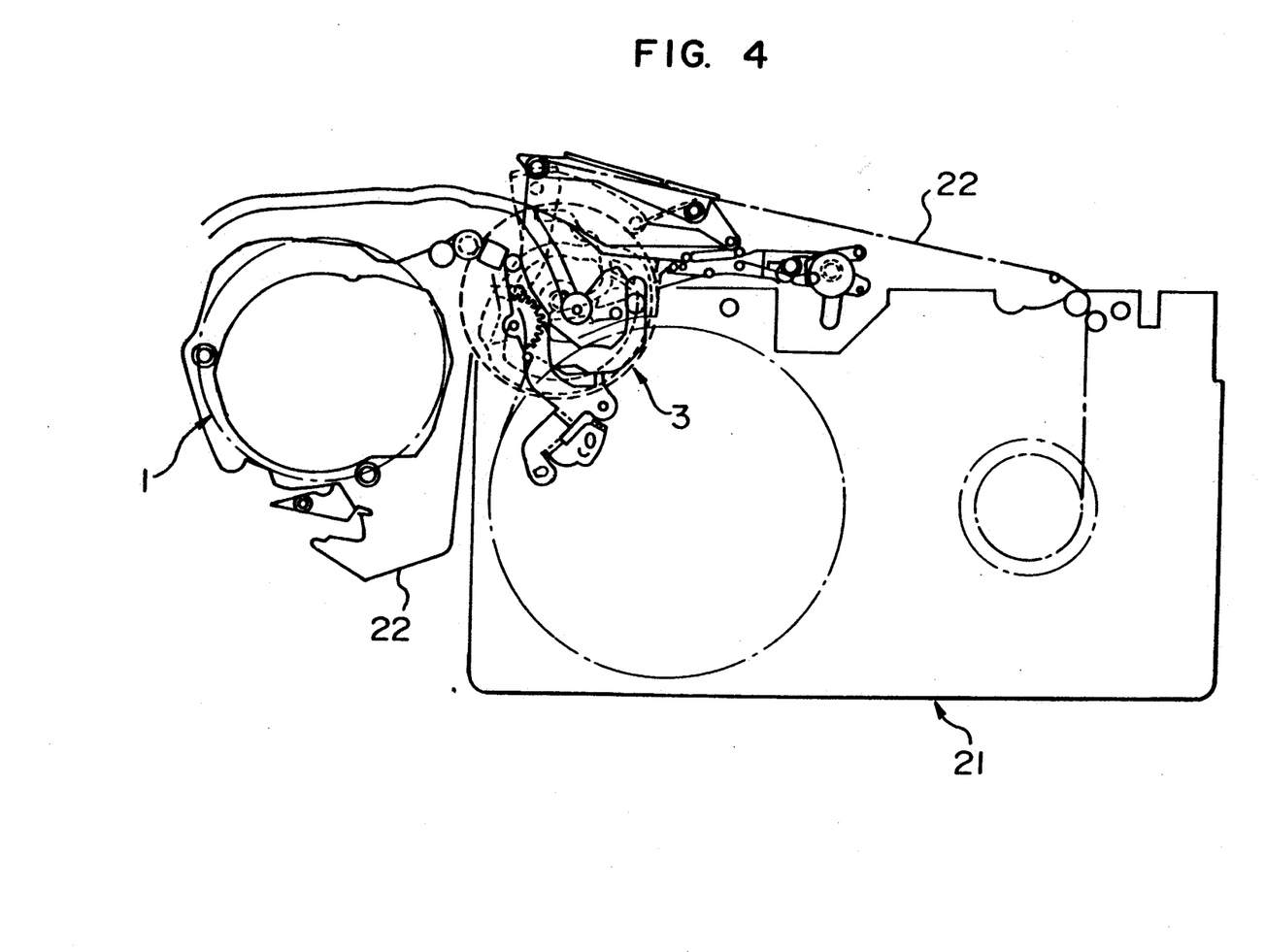
FIG. 4 is a plan view showing a tape running system shown in FIG. 3.

In a magnetic recording/reproducing apparatus incorporating a tape wrapping mechanism shown in FIGS. 1 and 2 according to a preferred embodiment of the present invention, a head drum 1 and a chassis 2 are arranged as shown in FIGS. 3A casette 21 housing therein a recording medium tape is to be mounted on the chassis 2. In case that the head drum 1 doesn't face the cassette 21 in a cassette loading direction, as shown in FIG. 4, the running passage of a tape 22 becomes long and complicated. In order to operate a single cam member to drive tape guide elements so as to draw out the tape 22 from the cassette and to wrap it onto the head drum 1, the single cam member cannot help becoming large and the cam rift thereof also cannot help becoming complicated as noted above. According, to this embodiment of the invention this problem is overcome in that a single cam member doesn't work all of tape wrapping operations, and a cam gear shares the role of the single cam member with a loading ring.

More particularly, with reference to FIGS. 1 and 2, in a tape wrapping mechanism according to an embodiment of the present invention, a driving motor 31 drives a cam gear 3 to rotate it exclusively. A worm 32 is provided between the motor 31 and the cam gear 3 to transfer a rotation of the motor 31 in a reduced fashion to the cam gear 3. The rotation of the cam gear 3 is reduced by a reduction gear 41 and transferred to a toothed first mode switch 4. The first mode switch 4 detects a rotational angle of the cam gear 3 and transfer it to a system controller 5. The cam gear 3 is provided with a cam rift 33.

A loading ring 6 is selectively driven by a capstan motor 7 as described later. The loading ring 6 is provided at an outer periphery thereof with a toothed portion and provided with drawing elements 61. When the loading ring 6 is rotated, the drawing elements 61 drive guide members which, in turn, draw out tape 22 from cassette 21 and abut it against head drum 1. The rotation of the loading ring 6 is reduced by a reduction gear 81 and then transferred to a toothed second mode switch 8. The second mode switch 8 detects a rotational angle of the loading ring 6 and transfer it to the system controller 5.

A rotational force is transferred from capstan motor 7 through a belt 91 to a pulley 9. The force is further selectively transferred to a supply reel stage SR (FIGS. 3, 5 and 6) or to a take-up reel stage TR (FIG. 6) so as to drive a supply reel or a take-up reel of the cassette 21, thereby running the tape 22. The pulley 9 is provided on a boss portion 92 thereof with a toothed portion. The boss portion 92 is capable of being connected to the loading ring 6 through a gear train 10 interposed therebetween. Namely, the loading ring 6 can be rotated by the capstan motor 7 through the pulley 9 and the gear train 10.

Figure 5:
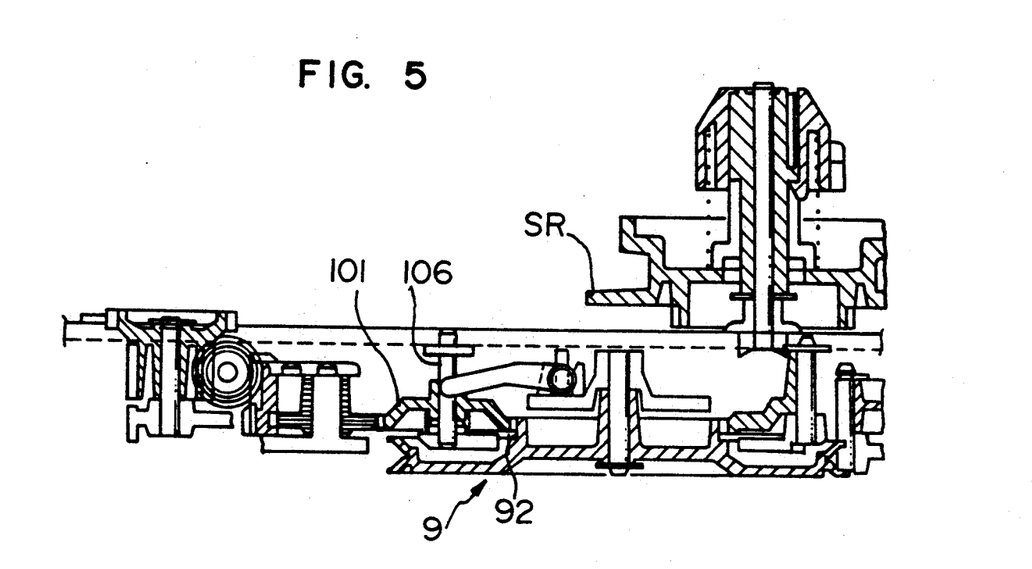
FIG. 5 is an enlarged partly sectional fragmentary side view showing the embodiment shown in FIG. 3 in a condition that a switch gear is in a first switching position.
Figure 6:
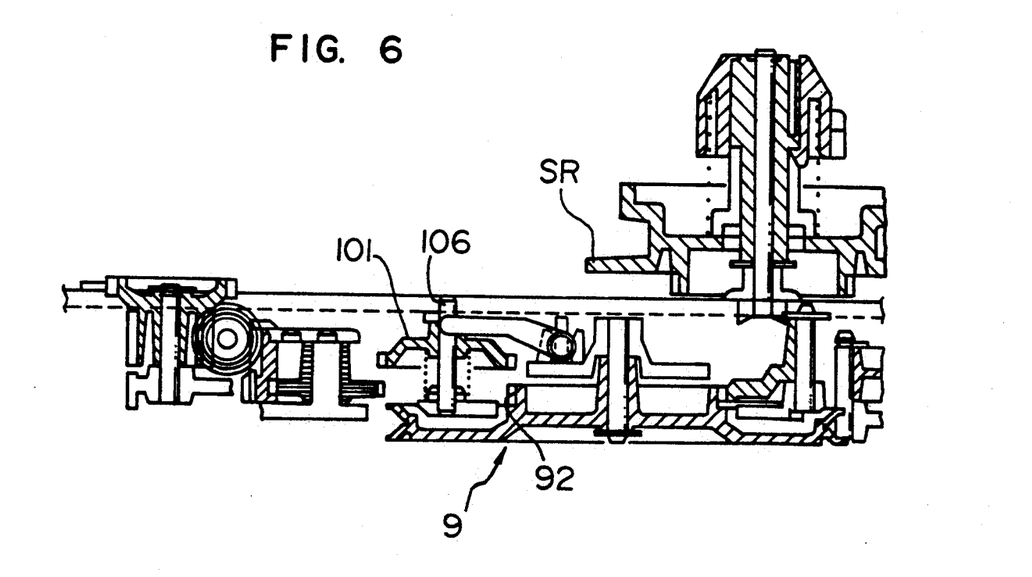
FIG. 6 is an enlarged partly sectional fragmentary side view showing the embodiment shown in FIG. 3 in a condition that the switch gear is in a second switching position.

The gear train 10 includes a switch gear 101 which selectively interrupts a driving connection between the loading ring 6 and the capstan motor 7. The gear train 10 further includes intermediate gears 102 to 104, and a worm 105. The switch gear 101 is mounted on a pillar 106 for axially moving (FIGS. 5 and 6). As shown in FIG. 5, in a first switching position, the switch gear 101 meshes with the toothed boss portion 92 to transfer the rotational force from the capstan motor 7 to the loading ring 6 so as to rotate it. In the second switching position, as shown in FIG. 6, the engagement between the switch gear 101 and the toothed boss portion 92 of the pulley 9 is released, so that no rotational force is transferred from the capstan motor 7 to the loading ring 6.

A mechanism 11 for switching over the switch gear 101 between the first and the second switching positions will be explained hereinunder referring to FIGS. 7 and 8.

The switching mechanism 11 includes a cam arm 111, a driving rod 112, a driven arm 113 and a switch arm 114. The cam arm 111 follows the cam rift 33 provided on the cam gear 3 and swings, so that an end portion of the arm 111 reciprocates in opposite directions on the drawings. The cam arm 111 is provided at the end portion thereof with a projection 111a. The driving rod 112 is coiled at a one end portion thereof around a pin 115 so as to form a helical torsion spring. The driven arm 113 is pivotally mounted at one end portion thereof on the pin 115 and the other end portion is free. The driven arm 113 is sat on the driving rod 112 and is provided at the other end portion thereof with a smooth projection 113a. The switch arm 114 can pivot on a pin 116 and is abutted at an end thereof against an end of the switch gear 101. The driving rod 112 extends at the other end thereof to the switch arm 114.

Figure 7:
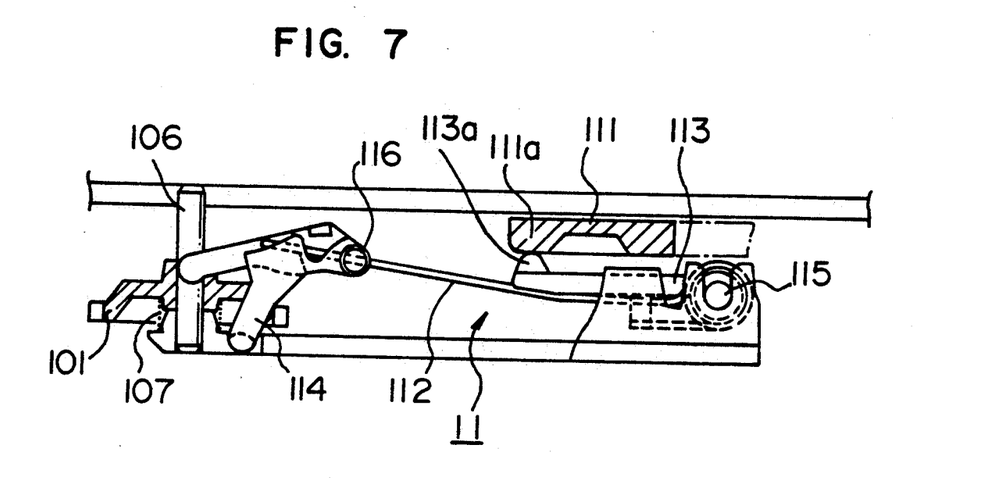
FIGS. 7 and 8 are enlarged fragmentary sectional views showing shift actions of the switch gear.
Figure 8:
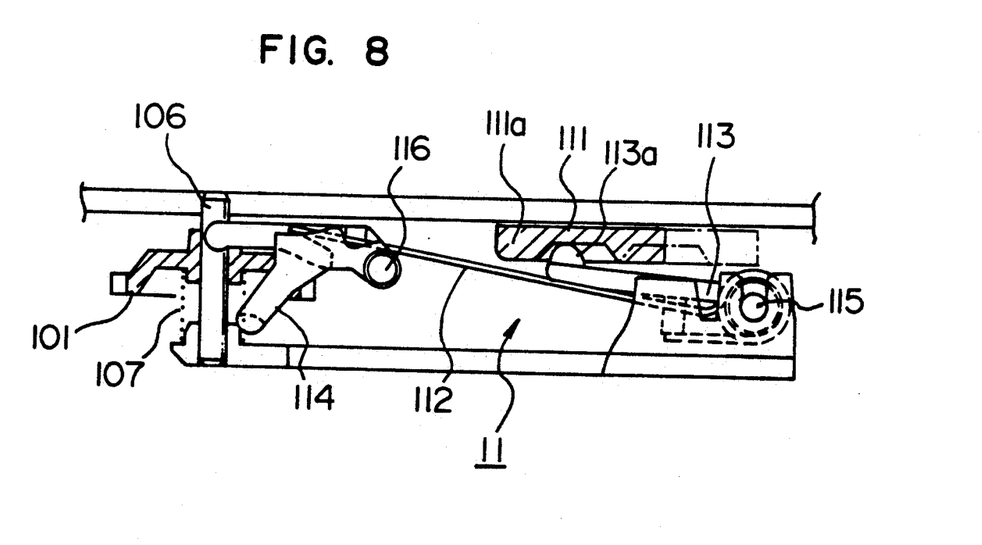

As shown in FIG. 7, when the cam arm 111 swings so that the projection 111a climbs over the projection 113a, the driven arm 113 is swung counterclockwise to bend the driving rod 112. As a result of this, the switch arm 114 swings counterclockwise to depress the switch gear 101 against a compression spring 107. The switch gear 101 is positioned in the first switching position so as to mesh with the toothed boss portion 92 of the pulley 9. Therefore, the rotational force from the capstan motor 7 is transferred through the gear train 10 to the loading ring 6 to rotate it.

When the cam arm 111 is further swung so that the projection 111a thereof disengages from the projection 113a of the driven arm 113, the driving rod 112 springs back to an initial position due to a repulsion thereof. Since the switch arm 114 ceases to urge the switch gear 101, it is moved to the second switching position by means of a compression spring 107 (FIG. 8). In the second switching position, the switch gear 101 is released from the toothed boss portion 92 of the pulley 9, so that no rotational force is transferred from the capstan motor 7 to the loading ring 6.

Figure 9:
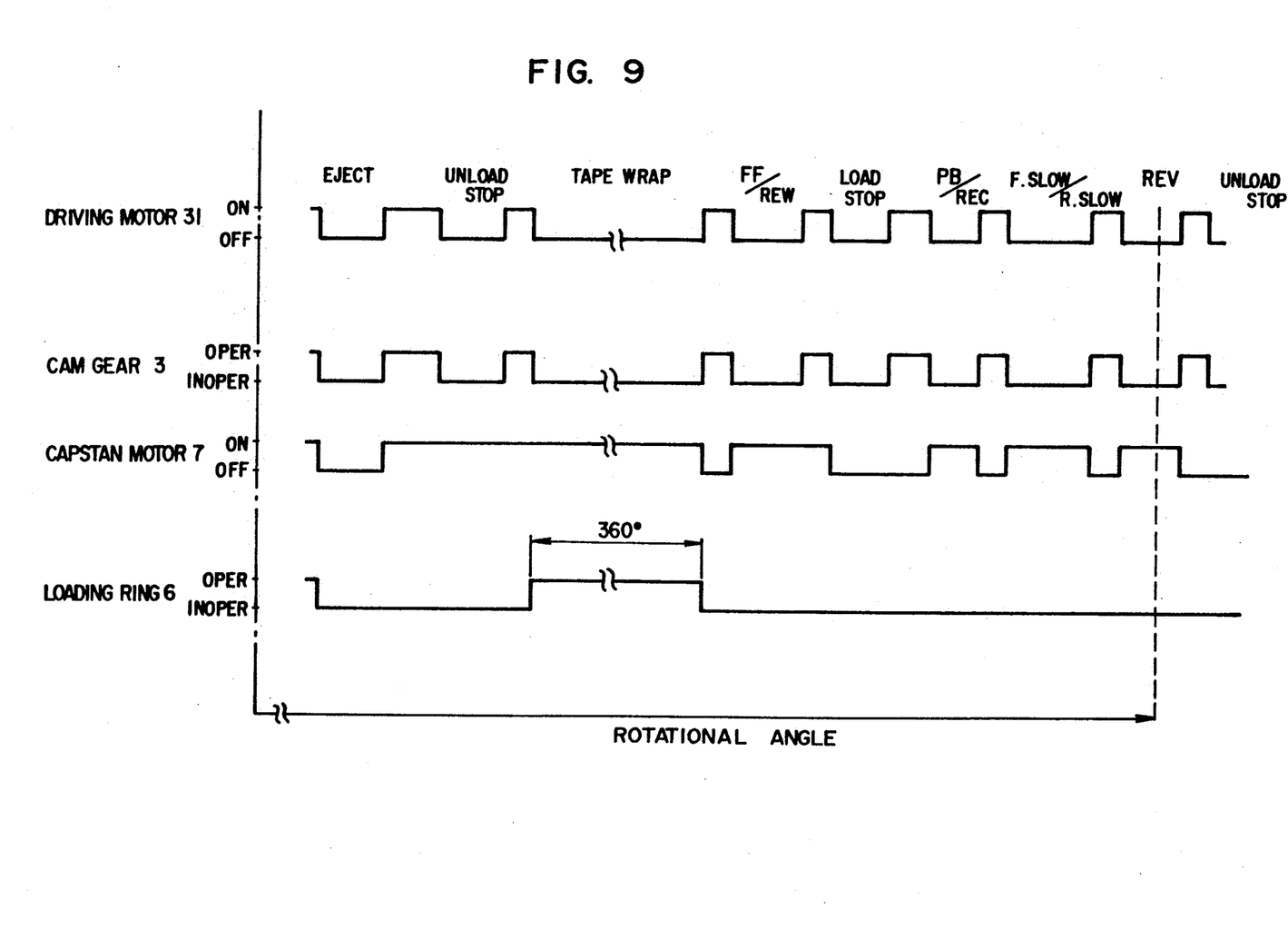
FIG. 9 is a time chart showing an operational relationship among the elements.

Next, referring to FIGS. 1, 2 and 9, the operations of elements in the magnetic recording/reproducing apparatus incorporating therein the above-mentioned tape wrapping mechanism will be described in each of operation modes, such as play back/recording mode. It should be understood that the kinds and the order of modes described hereinunder are examples, and then any other variations may be available.

The modes correspond to positions of the cam rift 33, or rotational angles of the cam gear 3. The mode is determined by the system controller 5 based on the informations from the first mode switch 4.

First, when the system controller 5 judges that the unload-stop mode is required, in which the tape incorporated in the cassette is abutted against the head drum, the system controller 5 drives the driving motor 31. According to this, the cam gear 3 is rotated by a predetermined angle. The cam rift 33 is so shaped that in this location, the end projection 111a of the cam arm 111 is positioned in a condition shown in FIG. 8. Therefore, since the switch gear 101 is located in the second switching position, the rotational force is transferred from the capstan motor 7 to the pulley 9 through the belt 91, but not to the loading ring 6. The rotational force from the capstan motor 7 is further transferred from the pulley 9 to the supply reel stage or the take-up reel stage, thereby driving the supply or the take-up reels to take up the slack of the tape in the cassette.

Second, in order to carry out the play back/recording operation immediately, the tape is wrapped onto the head drum. Such wrapping is carried out by rotation of the cam gear 3. When the unload-stop mode is completed, the system controller 5 makes the driving motor 31 inoperative. The cam rift 33 is so shaped that the end projection 111a of the cam arm 111 is shifted from the condition shown in FIG. 8 into the condition shown in FIG. 7 immediately before the completion of the unload-stop mode. Then, as mentioned above, the switch gear 101 is located in the first switching position, and is meshed with the toothed boss portion 92 of the pulley 9. According to this, the rotational force from the capstan motor 7 is transferred through the gear train 10 to the loading ring 6 to rotate it. The completion of tape wrapping onto the head drum by means of the guide members is judged by the rotational angle detected by the second mode switch 8. After the completion of tape wrapping, the rotation of the loading ring 6 is interrupted and the tape must be kept in a condition that it is wrapped onto the head drum. To this end, the system controller 5 restarts the driving motor 31 to rotate the cam gear 3 by a predetermined angle on the basis of the informations from the second mode switch 8. The cam rift 33 is then so shaped that in this location, the end projection 111a of the cam arm 111 is shifted from the condition shown in FIG. 7 into the condition shown in FIG. 8. According to this, as mentioned above, the switch gear 101 is located in the second switching position, and then is released from the toothed boss portion 92 of the pulley 9 to interrupt the rotation of the loading ring 6. In this embodiment, the gear train 10 includes the worm 105. Due to the locking character of the worm 105, it prevents the guide members from being returned or retracted by means of the tension of tape wrapped onto the head drum. Namely the tape is kept in the condition that it is wrapped onto the head drum.

Subsequently, in a fast-forward/fast-rewind mode, though the capstan motor 7 rotates to a higher speed to run the tape fast, the loading ring 6 doesn't rotate anymore.

The mode transfer from the fast-forward/fast-rewind mode to other modes, such as play back/recording mode, slow-forward mode, slow-reverse mode, cue-/reverse mode, and frame-by-frame mode is carried out by restarting the driving motor 31 to rotate the cam gear 3 by a predetermined angle. Namely, a cam arm 120 (FIG. 2) follows another cam rift provided on the cam gear 3 to press a pinch roller against a capstan.

Finally, a transfer to an ejection mode in which the cassette with tape is ejected from the apparatus is described hereinunder.

When an operator directs to eject the cassette, the system controller 5 operates the driving motor 31 to rotate the cam gear 3 reversely by a predetermined angle so as to draw back the tape 22 into the cassette 21 by means of the guide elements, thereby completing the unload-stop mode. Immediately before the completion of the unload-stop mode, the system controller 5 re-starts the driving motor 31 to rotate the cam gear 3 by a predetermined angle so as to shift the end projection 111a of the cam arm 111 from the position shown in FIG. 7 to the position shown in FIG. 8. Thereafter, the driving motor 31 is further operated to rotate the cam gear 3 so as to transfer to the ejection mode.

As apparent from the above-mentioned description, according to the present invention, the tape wrapping onto the head drum is carried out by means of the rotation of the loading ring, and all of the mode transfers aren't carried out by means of the cam rift provided on the cam gear as is done in the conventional art, they are carried out by means of the cam rift. Namely, the loading ring play a part of the cam rift. Accordingly, it is possible to shorten a length of the cam rift and to simplify the cam rift profile, thereby preventing the cam gear as well as the apparatus from being enlarged.

In the above-mentioned embodiment, the loading ring is rotated by the capstan motor 7 which mainly serves to rotate the supply reel stage and the take-up reel stage. However, it may be possible to provide another motor, i.e. a loading ring motor for exclusively rotating the loading ring. In this case, the gear train 10 and the switching mechanism for the switch gear 101 become unnecessary, and the system controller 5 detects the modes on the basis of the informations from the mode switches and operates the loading ring motor and the driving motor alternately. According to this, the same function as mentioned above can be obtained. Further, instead of the loading ring motor and the driving motor, it may be possible to provide a sole motor for selectively driving the loading ring and the cam gear. In this case, a mechanism is required for switching the engagements between such sole motor and the loading ring, and between such sole motor and the cam gear.

What is claimed is:

1. A method for wrapping a recording medium tape from a cassette onto a rotatable head drum in a magnetic recording/reproducing apparatus wherein the head drum does not face the cassette in a cassette-loading direction, said method comprising the following steps of:

rotating a cam member to operate an associative cam follower along a cam surface provided on said cam member to drivingly move guide elements for wrapping said tap onto said rotatable head drum;

interrupting the rotation of said cam member to interrupt the movement of said guide elements when said cam member reaches a predetermined angular position;

rotating a loading ring to drive said guide elements, instead of said cam follower, simultaneous with the interruption of the rotation of said cam member;

interrupting the rotation of said loading ring to interrupt the movement of said guide elements when said loading ring reaches a predetermined angular position; and re-rotating said cam member to operate said associative cam follower along a remaining cam surface provided on said cam member to drive said guide elements.

2. A magnetic recording/reproducing apparatus comprising:

a loading mechanism for positioning a cassette on a predetermined position, which cassette incorporates therein a recording medium tape;

a driving mechanism for running said recording medium tape;

a recording/reproducing mechanism including a rotatable head drum provided with a head assembly for reading and writing information onto said recording medium tape, said head drum being arranged so as not to face the cassette in a cassette-loading direction;

guide elements for wrapping said recording medium tape onto said head drum;

a cam member on which a cam surface is provided;

cam follower means following said cam surface to drive said guide elements;

a driving motor for driving said cam member;

a loading ring on which members are provided for drawing out said guide elements;

first means for selectively coupling said driving mechanism with said loading ring to transfer a force from said driving mechanism to said loading ring to rotate it;

second means for coupling said driving motor with said cam member to rotate it; and means for alternatively interrupting said first and said second coupling means.

* * * * *